March 5, 1963   A. P. BALZER   3,079,742
CROP CUTTING, CRUSHING AND WINDROWING DEVICE
Filed Jan. 19, 1961   3 Sheets-Sheet 1
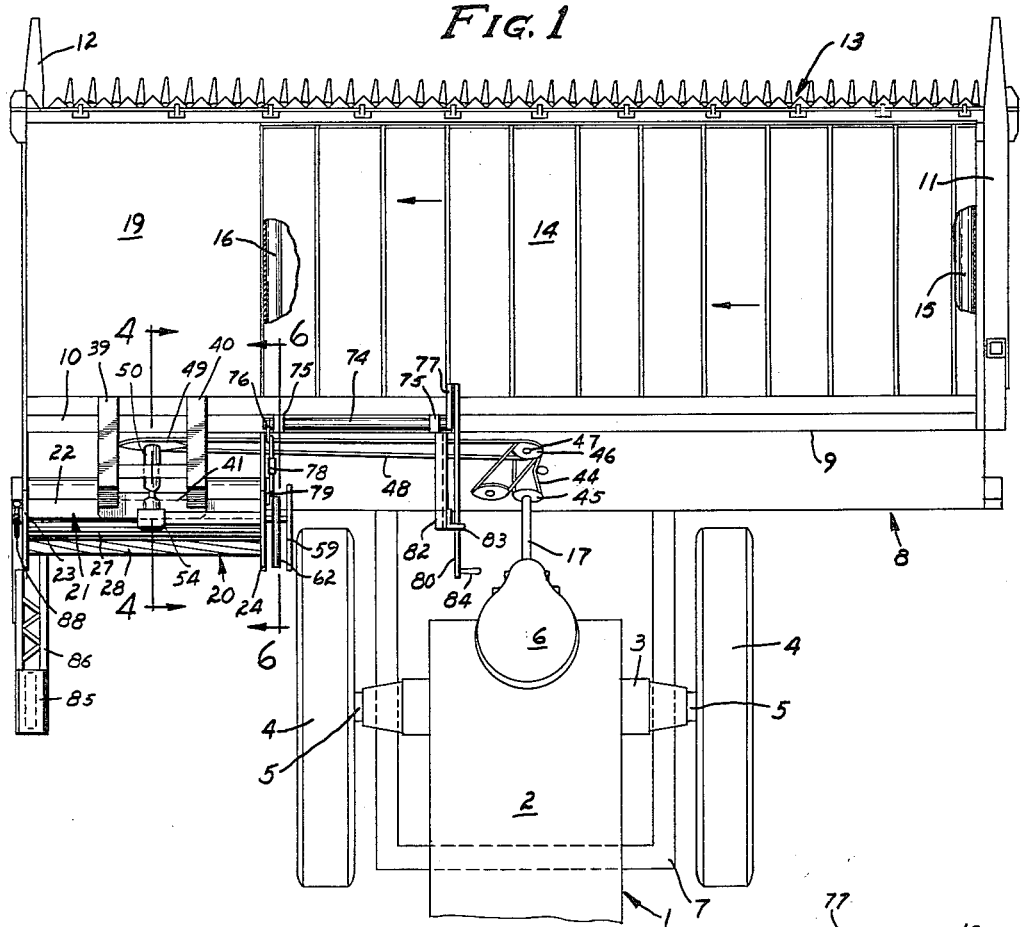
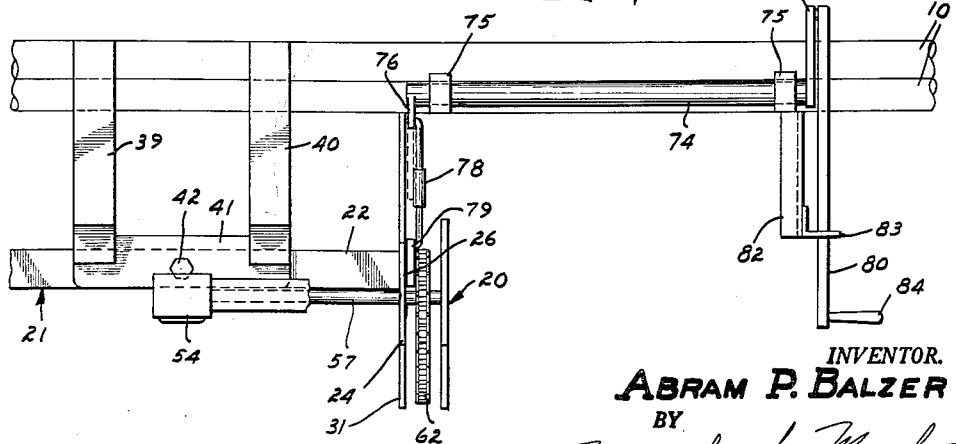
INVENTOR.
ABRAM P. BALZER
BY
Merchant & Merchant
ATTORNEYS March 5, 1963  A. P. BALZER  3,079,742
CROP CUTTING, CRUSHING AND WINDROWING DEVICE
Filed Jan. 19, 1961  3 Sheets-Sheet 2

INVENTOR.
ABRAM P. BALZER
BY
Merchant & Merchant
ATTORNEYS

March 5, 1963  A. P. BALZER  3,079,742
CROP CUTTING, CRUSHING AND WINDROWING DEVICE
Filed Jan. 19, 1961  3 Sheets-Sheet 3

INVENTOR.
ABRAM P. BALZER
BY
Merchant & Merchant
ATTORNEYS

3,079,742
Patented Mar. 5, 1963

3,079,742
CROP CUTTING, CRUSHING AND WINDROWING DEVICE
Abram P. Balzer, Mountain Lake, Minn.
Filed Jan. 19, 1961, Ser. No. 83,769
3 Claims. (Cl. 56—23)

My invention relates generally to the field handling of cut crops such as hay and the like, and more particularly to hay conditioning and distributing equipment for use with swathers or windrowers in the laying of windrows of the crop in a field.

An important object of my invention is the provision of novel means for mounting a hay conditioning apparatus to a swather, whereby to receive the cut crop from the swather and direct the conditioned crop in selected directions generally rearwardly relative to movement of the swather, to build successive single windrows of desired spaced apart relationship, or double windrows in side by side or overlapping relationship. To this end, I provide a crop conditioner comprising a frame, a pair of conditioner rolls journalled in the frame and between which the cut crop is moved, means for mounting the frame on a swather adjacent the delivery portion thereof for pivotal movements on a generally vertical axis, and means for locking the frame in desired set positions of pivotal movement thereof relative to the swather.

Another object of my invention is the provision of novel means for imparting said pivotal movements to the crop conditioner frame and for releasably locking the frame, whereby the same may be quickly and easily adjusted to different delivery angles relative to the direction of movement of the equipment even during movement of the equipment over a field.

Still another object of my invention is the provision of apparatus as set forth which is relatively simple and inexpensive to produce and install on a swather, which is highly efficient in operation, and which is rugged in construction and durable in use.

The above, and still further highly important objects and advantages of my invention will become apparent from the following detailed specification, appended claims and attached drawings. Referring to the drawings, which illustrate the invention, and in which like reference characters indicate like parts throughout the several views:

FIG. 1 is a fragmentary view in top plan of a tractor mounted swather and crop conditioner arranged according to my invention;

FIG. 2 is an enlarged fragmentary view in top plan of a portion of FIG. 1;

Figure 3:
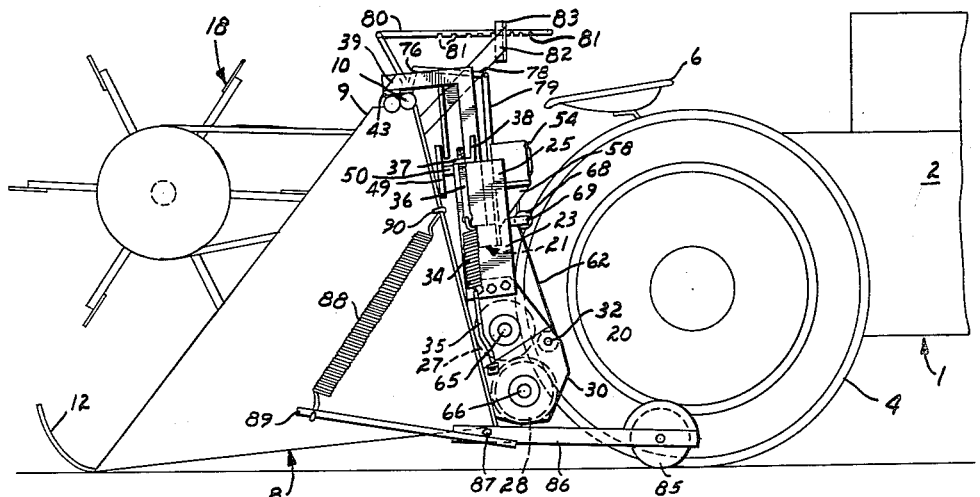
FIG. 3 is a fragmentary view in side elevation as seen from the left with respect to FIG. 1.

Referring with greater detail to the drawings, the numeral 1 indictes the rear end portion of a conventional tractor, the same comprising a body portion 2, a rear axle housing 3, rear drive wheels 4 mounted on opposite ends of a rear axle 5 projecting laterally outwardly from opposite ends of the axle housing 3, and an operator's seat 6.

Extending transversely with respect to the tractor 1, and mounted to the tractor 1 rearwardly thereof, by means of a mounting frame 7 and other suitable elements, not shown, is a swather 8. The swather 8 comprises frame structure 9 including a tubular member 10 and end frame members 11 and 12, a conventional sickle-type mower 13, an endless conveyor belt 14 entrained over frame-journalled belt-supporting rolls 15 and 16, and conventional means for driving the mower 13 and conveyor belt 14, including a drive shaft 17 that is suitably coupled to the power take off mechanism, not shown, but which is included in most present day tractors. The swather 1 further includes the usual crop feeding reel 18, see FIG. 3, which overlies the sickle mower 13, and which is driven from the power take-off shaft 17, in the usual manner, by power transmission mechanism, not shown. In view of the fact that the various elements which comprise the swather 8 and the mounting of the swather to the tractor 1, do not in themselves comprise the instant invention, further showing and detailed description thereof is omitted, in the interest of brevity. The mounting frame 7 and its connection to the tractor 1 and swather 8 are clearly disclosed in my prior United States Letters Patent No. 2,904,117, issued September 15, 1959, and entitled "Implement Mounting Device for Tractors." In the present arrangement, like that illustrated in my prior patent above-identified, the swather 8 faces rearwardly with respect to the tractor 1, the tractor 1 being driven rearwardly over the field to cut and windrow the crop. For this reason, the operator's seat 6 is shown as being reversed, so that the operator may more easily guide the tractor and swather. If desired, the tractor controls, not shown, may be modified to be easily reached by the tractor operator, or if desired, the seat 6 may be positioned elsewhere on the tractor body 2 whereby to afford easy access to the controls.

As shown by arrows in FIG. 1, the conveyor belt 14 is driven in a direction to convey the cut crop deposited thereon from the right to the left with respect to FIG. 1 toward an open space or apron 19 directly behind the adjacent end portion of the sickle mower 13, from whence the cut crop is moved rearwardly by action of the reel 18 toward the crimping rolls of a hay conditioner indicated in its entirety by the reference character 20. The material, passing rearwardly through the hay conditioner 20 is deposited on the remaining stubble in a windrow, indicated generally at A in FIGS. 7 and 8.

The hay conditioner 20 includes a generally rectangular frame 21 of inverted generally U-shape, comprising a generally horizontal frame member 22 and a pair of depending legs 23 and 24, the legs 23 and 24 having upwardly extending upper end portions 25 and 26 respectively. A pair of crimping rollers 27 and 28 are journalled in the lower end portions of the legs 23 and 24 on vertically spaced generally horizontal axes extending generally transversely of the direction of travel of the tractor and swather, the upper crimping roller 27 preferably being plain, the lower cooperating crimping roller 28 preferably being provided with circumferentially spaced helically extending crimping bars or the like 29. The legs 23 and 24 include extension portions 30 and 31 respectively that are pivotally connected to their respective legs 23 and 24 by aligned pivot shafts 32 and 33, whereby the crimping rolls 28 may be moved toward or away from the upper crimping roll 27. The lower leg portions 30 and 31, together with the lower crimping roll 28, are yieldingly urged in an upward direction by a coil tension spring 34 connected at one end to the leg extension 30 by means of a link 35, the upper end of the spring 34 being connected to the lower end of a generally vertically disposed adjustment screw 36 that extends upwardly slidably through a bracket 37 at the upper end of the leg extension 25. A crank handle equipped nut 38 is screw threaded on the upper end portion of the screw 36, and rests upon the bracket 37, whereby tension on the spring 34 may be quickly and easily adjusted.

Figure 4:
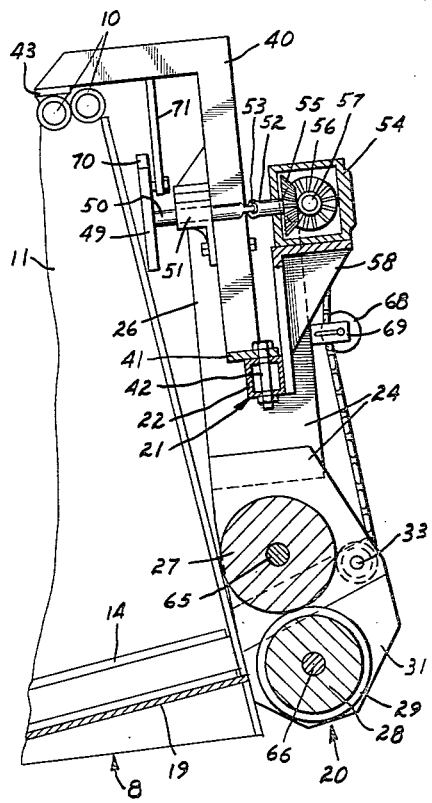
FIG. 4 is an enlarged fragmentary transverse section taken substantially on the line 4—4 of FIG. 1.
Figure 5:
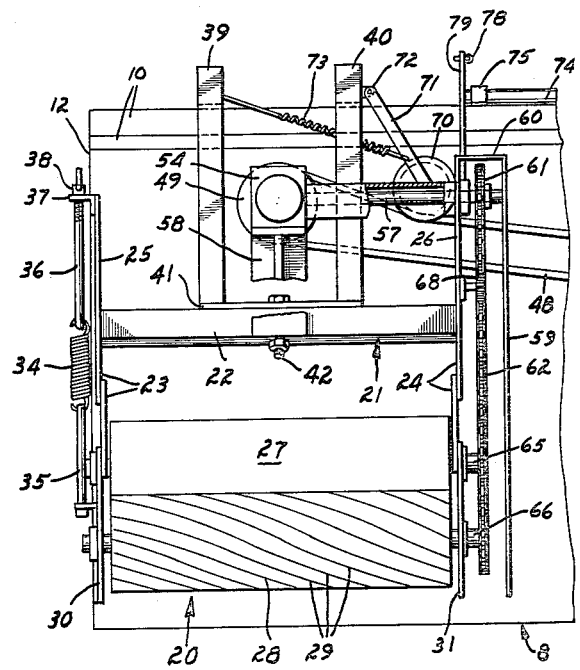
FIG. 5 is a fragmentary view in rear elevation of the hay or crop conditioner of my invention.

Means for mounting the hay conditioner frame 21 to the swather 8 comprises a pair of laterally spaced angle members 39 and 40, preferably made from cross sectionally rectangular metallic tubing, a generally horizontally disposed mounting plate 41, and a generally vertically disposed nut-equipped pivot bolt 42 extending through the central portion of the mounting plate 41 and the horizontal member 22 intermediate the ends thereof, whereby the frame 21 and parts carried thereby is pivotally movable on the generally vertical axis of the pivot bolt 42, the top surface of the horizontal member 22 engaging the bottom surface of the mounting plate 41, see particularly FIGS. 4 and 5. The opposite ends of the angle bars 39 and 40 rest upon, and are rigidly secured to flat saddle elements 43 that are welded to spaced portions of the tubular frame member 10 of the swather 8. The angular mounting bars 39 and 40 are preferably welded to the saddle members 43. However, if desired, the bars 39 and 40 may be releasably anchored to the saddle members 43 by machine bolts or the like, not shown.

Rotation is imparted to the crimping rolls 27 and 28 from the power take-off shaft 17 by power transmission mechanism including a primary drive belt 44 entrained over a pulley 45 fast on the shaft 17 and a multi-grooved pulley 46 mounted on a shaft 47 that is suitably journalled in the swather 8, and a secondary drive belt 48 entrained over the multi grooved pulley 46 and another pulley 49 fast on the front end of an input shaft 50 journalled in a bearing 51 that is suitably mounted between the angle bars 39 and 40. The rear end of the input shaft 50 is operatively coupled to a pinion shaft 52 by means of a universal joint 53 disposed on the upwardly extended axis of the pivot bolt 42, the pinion shaft 52 being suitably journalled in a gear housing 54 and having its inner end keyed or otherwise secured to a bevel gear 55 within the gear housing 54. The gear 55 has meshing engagement with a cooperating bevel gear 56 secured to one end of a transverse shaft 57 that extends horizontally toward the upwardly extended portion 26 of the leg 24 and which is suitably journalled therein. The gear housing 54 is supported from the generally horizontal frame member 22 by means of a bracket or the like 58.

Figure 6:
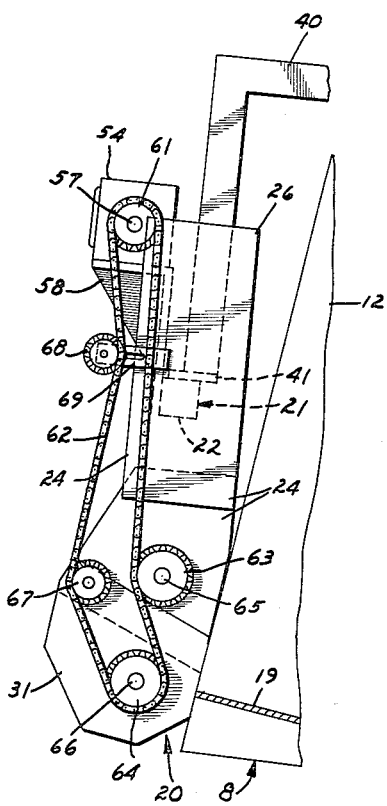
FIG. 6 is an enlarged fragmentary section taken substantially on the line 6—6 of FIG. 1.

The outer end of the transverse shaft 57 is also journalled in the upper end portion of a plate-like member 59 that is disposed in laterally outwardly spaced parallel relation to the adjacent leg 24, and which is supported from the leg 24 by one or more spacer elements 60, one of which is shown in FIG. 5. A sprocket wheel 61 is mounted fast on the transverse shaft 57 between the upwardly extended portion 26 of the leg 24 and the plate-like member 59, and has entrained thereover an endless link chain 62 that is also entrained over sprocket wheels 63 and 64 mounted fast on respective shafts 65 and 66 that extend axially outwardly from respective crimping rolls 27 and 28. The link chain 62 runs over a spacer sprocket 67 suitably mounted on the lower leg extension portion 31, and over an adjustable idler sprocket 68 that is adjustably mounted on a slotted supporting bracket 69 welded or otherwise rigidly secured to the adjacent leg 24. With reference particularly to FIG. 6, it will be seen that the endless link chain 62 is arranged with respect to the sprocket wheels 63 and 64 to drive the crimping rolls 27 and 28 in opposite directions whereby material is fed therebetween. Further, with reference to FIG. 5, it will be seen that the secondary drive belt 48 is maintained at proper tension by an idler pulley 70 that is journalled on one end of a mounting arm 71 pivotally connected to the angle bar 40 for swinging movements toward and away from the adjacent flight of the secondary drive belt 48, as indicated at 72. A coil tension spring 73 is anchored at one end to the mounting arm 71, and operatively coupled at its other end to the angle bar 39, to yieldingly urge the mounting arm 71 and idler pulley 70 toward tightening engagement with the secondary drive belt 48.

For the purpose of imparting pivotal movements to the hay conditioner 20 on the axis of its pivotal mounting bolt 42, and for releasably locking the hay conditioner 20 in various positions of pivotal movement thereof, I provide a rockshaft 74 that is journalled in spaced bearings 75 suitably mounted on the frame structure 9 of the swather 8. At its opposite ends, the rockshaft 74 is provided with angularly displaced radial arms 76 and 77, the former of which has its outer end pivotally connected to one end of a rigid link 78, the opposite end of the links 78 being pivotally connected to an upstanding arm 79, that is bolted or otherwise rigidly secured to the plate-like member 59. The radially outer end of the crank arm 77 is pivotally connected to a latch bar 80 that is provided at its lower longitudinal edge with a plurality of longitudinally spaced downwardly opening notches or recesses 81 that are adapted to selectively receive a detent element 82 mounted in a guide bracket 83 rigidly secured to the swather frame structure 9. The latch bar 80 is provided with a handle 84 conveniently located to an operator. When the latch bar 80 is raised out of engagement with the detent element 82, the latch bar may be moved forwardly or rearwardly to impart pivotal movement to the frame 21 about the generally vertical axis of the pivot bolt 42, whereby to direct cut crop passing between the crimping rolls 27 and 28 at different desired angles generally rearwardly with respect to the direction of movement of the swather.

Figure 7:
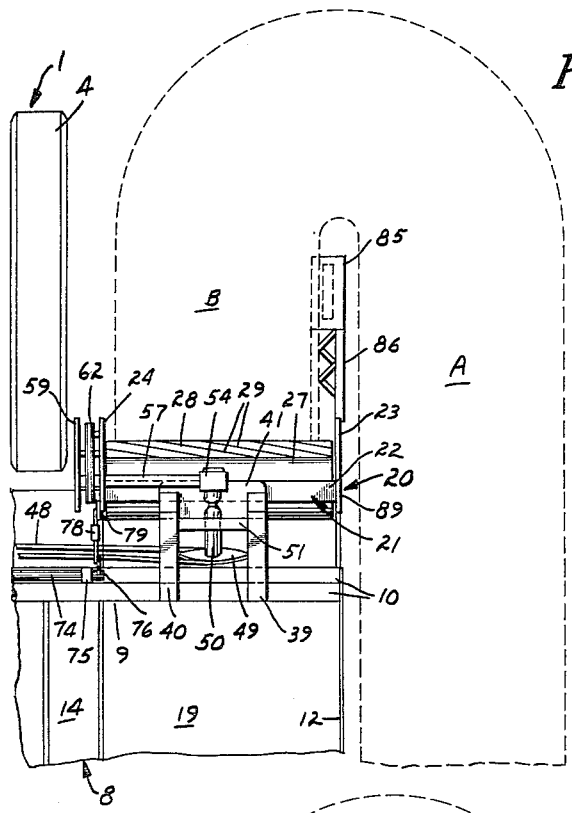
FIG. 7 is a fragmentary view partly in top plan and partly diagrammatic, illustrating the use of my invention in a pair of windrowers in closely spaced side by side relation; and, FIG. 8 is a view corresponding to FIG. 7 but showing a different position of the crop conditioner of my invention and the overlapping windrow arrangement obtained thereby.
Figure 8:
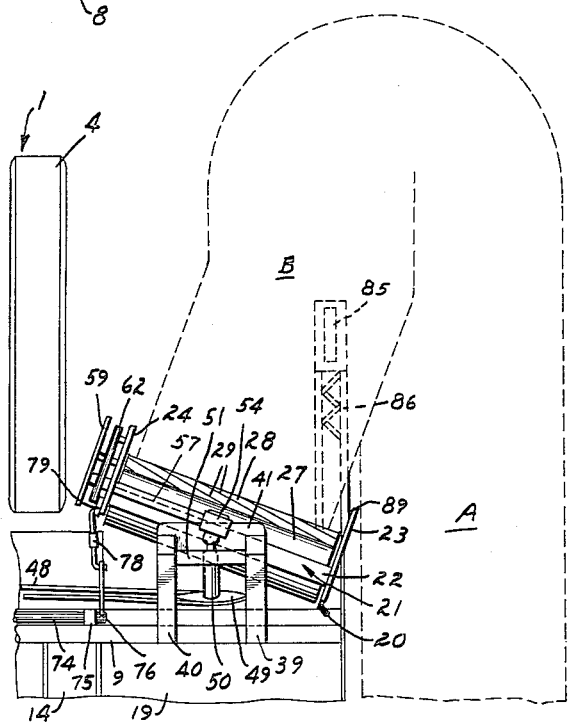

With the above described pivotal adjustment of the hay conditioner 20, the cut crop may be deposited in windrows of various desired spaced apart relationship. For instance, with reference to FIG. 7, when the axes of the crimping rolls 27 and 28 are disposed normal to the direction of travel of the swather, a windrow B is disposed in closely spaced relationship to the windrow A when the swather traverses the field in a reverse direction to that which the swather traveled in producing the windrow A. It will be noted that, by pivotally adjusting the hay conditioner 20 so that the material is delivered at an oblique angle toward the adjacent wheel 4 of the tractor 1, the adjacent windrows A and B will be spaced apart a greater distance than that shown in FIG. 7. With reference to FIG. 8, it will be noted that, when the tractor 1 traverses the field in one direction to provide the windrow A, the hay conditioner 20 is preferably disposed with the axes of the crimping rolls 27 and 28 normal to the direction of travel of the swather. However, when the swather makes a return trip over the field, with the hay conditioner 20 pivotally adjusted as shown in FIG. 8, the windrow B will be disposed in at least partially over-lapping relation to the windrow A. This is particularly advantageous in fields where the yield is relatively light, or under conditions where the moisture content of the crop is not too great. Obviously, where the yield is particularly heavy, or when the moisture content of the crop is relatively high, more rapid curing of the crop is obtained by separating the windrows, as indicated in FIG. 7.

Inasmuch as the windrower 20 is supported by the adjacent end of the swather 8, I have found it advisable to counterbalance the weight of the hay conditioner 20 to maintain the swather in balance from end to end. To this end, I provide a supplementary swather supporting wheel 85 that is journalled in one end of a lever arm 86 that is pivotally mounted to the end of the swather 8 adjacent the hay conditioner 20, as indicated at 87, see FIG. 3. The lever arm 86 preferably extends forwardly and rearwardly with respect to the direction of travel of the machine, and a coil tension counterbalancing spring 88 is anchored at one end to the forward end 89 of the lever arm 86, and at its other end to the swather frame structure 9, as indicated at 90.

While I have shown and described a commercial embodiment of my novel windrowing device, it will be understood that the same is capable of modification without departure from the spirit and scope of the invention, as defined in the claims.

What I claim is:

1. In a hay conditioner, a frame, means for mounting said frame to the delivery portion of a swather for pivotal movements of said frame relative to said swather on a generally vertical axis, a pair of cooperating conditioner rolls journalled in said frame on generally vertically spaced horizontal axes extending generally transversely of the direction of travel of the swather and positioned to receive cut hay crop delivered by said swather, power operated means for imparting rotation to said conditioner rolls in directions to cause the cut crop to be moved generally rearwardly between said rolls, and means for pivotally moving said frame and rolls on said vertical axis relative to said swather and for releasably locking said frame in selected positions of pivotal movement thereof, whereby said conditioner rolls are positioned to direct the cut and conditioned crop in any selected direction generally rearwardly relative to the direction of movement of the swather.

2. In a hay conditioner, mounting structure having means for rigid attachment to a swather adjacent the delivery portion of the swather, a frame pivotally secured to said mounting structure for swinging movement relative to the swather on a generally vertical axis, a pair of cooperating conditioner rolls journalled in said frame on generally vertically spaced horizontal axes extending generally transversely of the direction of travel of the swather and positioned to receive cut hay crop delivered by said swather, power operated means for imparting rotation to said conditioner rolls in directions to cause the cut crop to be moved generally rearwardly between said rolls, and means for imparting pivotal movement to said frame and rolls on said vertical axis and for releasably locking said frame in different selected positions of said pivotal movement, whereby said conditioner rolls are positioned to direct the cut and conditioned crop in any selected direction generally rearwardly relative to the direction of movement of the swather.

3. In combination with a swather comprising, a mower extending transversely of the direction of travel of the swather, a transversely extending crop conveyor arranged to receive cut crop from the mower end to deliver the crop to one side of the swather, and power operated means for driving said mower and conveyor; a hay conditioner comprising, a frame, means mounting said frame on said swather adjacent the delivery end of said conveyor for pivotal movements relative to said swather on a generally vertical axis, a pair of cooperating conditioner rolls journalled in said frame on generally vertically spaced horizontal axes extending generally transversely of the direction of travel of the swather and positioned to receive cut hay crop delivered by said conveyor, power transmission mechanism including a drive connection to said power operated means for imparting rotation to said conditioner rolls in directions to cause the cut crop to be moved generally rearwardly between said rolls, and means for imparting pivotal movement to said frame and rolls relative to said swather on said vertical axis and for releasably locking said frame in selected positions of said pivotal movement, whereby said conditioner rolls are positioned to direct the cut and conditioned crop in any selected direction generally rearwardly relative to the direction of movement of the swather.

References Cited in the file of this patent

UNITED STATES PATENTS

| | | |
|---|---|---|
| 1,378,427 | Slathar | May 17, 1921 |
| 1,954,630 | Livesay | Apr. 10, 1934 |
| 2,488,543 | Johnson et al. | Nov. 22, 1949 |
| 2,511,841 | Gaterman | June 20, 1950 |
| 2,989,829 | Heth et al. | June 27, 1961 |